(12) United States Patent
Li et al.

(10) Patent No.: US 12,173,955 B2
(45) Date of Patent: Dec. 24, 2024

(54) HINGE AND REFRIGERATION EQUIPMENT

(71) Applicants: HEFEI HUALING CO., LTD., Anhui (CN); HEFEI MIDEA REFRIGERATOR CO., LTD., Anhui (CN); MIDEA GROUP CO., LTD., Guangdong (CN)

(72) Inventors: Yanping Li, Anhui (CN); Huawei Zhang, Anhui (CN); Long Chen, Anhui (CN); Rong Wang, Anhui (CN); Pengkai Liu, Anhui (CN)

(73) Assignees: HEIFEI HAULING CO., LTD., Anhui (CN); HEFEI MIDEA REFRIGERATOR CO., LTD., Anhui (CN); MIDEA GROUP CO., LTD., Guangdong (CN)

( * ) Notice: Subject to any disclaimer, the term of this patent is extended or adjusted under 35 U.S.C. 154(b) by 268 days.

(21) Appl. No.: 17/913,125

(22) PCT Filed: Mar. 19, 2021

(86) PCT No.: PCT/CN2021/081869
§ 371 (c)(1),
(2) Date: Sep. 20, 2022

(87) PCT Pub. No.: WO2021/185366
PCT Pub. Date: Sep. 23, 2021

(65) Prior Publication Data
US 2023/0114344 A1 Apr. 13, 2023

(30) Foreign Application Priority Data
Mar. 20, 2020 (CN) .......................... 202010210537.6

(51) Int. Cl.
F25D 23/02 (2006.01)
E05D 7/00 (2006.01)
F16C 11/04 (2006.01)

(52) U.S. Cl.
CPC ......... *F25D 23/028* (2013.01); *E05D 7/0027* (2013.01); *F16C 11/04* (2013.01); *E05Y 2900/31* (2013.01)

(58) Field of Classification Search
None
See application file for complete search history.

(56) References Cited

U.S. PATENT DOCUMENTS 2,685,102 A * 8/1954 Forkey ...................... E05D 3/02
16/284
3,083,402 A * 4/1963 Foltz ........................ E05F 1/063
16/318

(Continued)

FOREIGN PATENT DOCUMENTS

CN 2156260 Y 2/1994
CN 2580059 Y 10/2003

(Continued)

*Primary Examiner* — Hanh V Tran
(74) *Attorney, Agent, or Firm* — Seed IP Law Group LLP

(57) ABSTRACT

Disclosed are a hinge and a refrigeration equipment. The hinge includes a vertical hinge shaft, a first hinge base and a second hinge base. The first hinge base includes a first installation plate and a first sleeve rotatably connected to the hinge shaft to make the first sleeve rotate around the hinge shaft. A lower end of the first sleeve is provided with a first slope sloping downwards. The second hinge base below the first hinge base includes a second installation plate and a second sleeve fixed on the hinge shaft. An upper end of the second sleeve is provided with a second slope sloping upwards. The second slope abuts against and cooperates with the first slope for the first sleeve to move from a first position to a second position along a direction away from the (Continued)

second sleeve or from the second position to the first position along a direction close to the second sleeve while being rotated around the hinge shaft.

20 Claims, 13 Drawing Sheets

(56) References Cited

U.S. PATENT DOCUMENTS

| | | | | |
|---|---|---|---|---|
| 3,398,487 A * | 8/1968 | Matyas | ...................... | E06B 3/72 16/312 |
| 3,545,031 A * | 12/1970 | Dielman | ................. | E05F 1/063 16/314 |
| 4,991,259 A * | 2/1991 | Finkelstein | ........... | E05F 1/1223 16/312 |
| 5,152,029 A * | 10/1992 | Pai | ............................ | E05F 3/20 16/54 |
| 5,500,984 A * | 3/1996 | Lee | ........................ | E05D 7/081 16/312 |
| 7,000,289 B2 * | 2/2006 | Cedrone | ................. | E05F 1/063 16/273 |
| 8,701,247 B1 * | 4/2014 | Shargh | .................... | E05D 11/02 16/386 |
| 8,845,045 B2 * | 9/2014 | Stubblefield | .......... | F25D 23/028 312/405 |
| 9,677,310 B1 * | 6/2017 | Russo | .................... | E05D 7/0027 |
| 9,739,523 B1 * | 8/2017 | Augsburger | .............. | E05D 3/02 |
| 11,352,822 B2 * | 6/2022 | Brown | .................... | E05F 1/063 |
| 2005/0011046 A1 * | 1/2005 | Dionysian | ............... | E05F 1/063 16/316 |
| 2005/0220294 A1 * | 10/2005 | Gupte | ................. | H04M 1/0218 379/433.13 |
| 2007/0000087 A1 * | 1/2007 | Hour | ....................... | E05F 1/063 16/50 |
| 2014/0173852 A1 * | 6/2014 | Heninger | .................. | E05D 5/14 16/375 |
| 2014/0215759 A1 * | 8/2014 | Mitchell | ............... | E05D 7/0423 16/235 |
| 2016/0083993 A1 * | 3/2016 | Grewe | .................. | E05F 1/1223 29/428 |
| 2018/0149409 A1 * | 5/2018 | Ramm | .................... | E05D 15/00 |
| 2021/0262672 A1 * | 8/2021 | Crawford | .............. | F24C 15/023 |

FOREIGN PATENT DOCUMENTS

| | | | | |
|---|---|---|---|---|
| CN | 203066829 U | | 7/2013 | |
| CN | 203214573 U | * | 9/2013 | |
| CN | 204152350 U | | 2/2015 | |
| CN | 104729202 A | | 6/2015 | |
| CN | 110748255 A | | 2/2020 | |
| CN | 111350428 A | | 6/2020 | |
| DE | 3638384 A1 | | 5/1988 | |
| DE | 10204326 A1 | * | 8/2003 | .............. E05F 1/066 |
| EP | 2233670 B1 | * | 9/2017 | ............... A47K 3/36 |
| FR | 2177435 A1 | | 11/1973 | |
| FR | 2826046 A1 | | 12/2002 | |
| GB | 2158872 A | | 11/1985 | |
| KR | 2007008348 A | * | 1/2007 | ............ E05F 1/1215 |
| KR | 20110087929 A | * | 8/2011 | |
| RU | 2632037 C2 | | 10/2017 | |
| WO | WO 2019186364 A1 | | 10/2019 | |

* cited by examiner

HINGE AND REFRIGERATION EQUIPMENT

CROSS-REFERENCE TO RELATED APPLICATIONS

This application claims priority to Chinese Application No. 202010210537.6, filed on Mar. 20, 2020, entitled "HINGE AND REFRIGERATION EQUIPMENT", the entire disclosure of which is incorporated herein by reference.

TECHNICAL FIELD

The present disclosure relates to the technical field of refrigeration equipment, in particular to a hinge and a refrigeration equipment.

BACKGROUND

With the development of science and technology and the improvement of people's living standards, refrigeration equipment, such as refrigerators, are increasingly indispensable in daily life. The door and the refrigerator body of a refrigerator are usually hinged by the hinges. At present, a hinge is usually formed by assembling the spring, the hinge shaft, the shaft sleeve, the hinge cover and other parts together. The structure is complex and a large number of parts are included. A plurality of assembling processes are needed and the production efficiency of the hinge is low, which affects the production efficiency of the refrigerator.

In addition, door seal strips are further provided between the refrigerator body and the door. After the door is closed, a magnet on the door carries out compensation movement, thus to seal the door and the refrigerator body. Usually, the hinge shaft of the hinge is provided inside the refrigerator body, which makes it difficult to control a minimum spacing between the refrigerator body and the door seal strips through the hinge shaft in the actual production. When the minimum spacing between the refrigerator body and the door seal strips is shorter than the moving distance of the door seal strips during the compensation movement, the edges of the door seal are prone to be wrung during the process of closing the door, which leads to a poor sealing effect of the door and a poor cooling effect of the refrigerator.

Moreover, the conventional hinge can only ensure the function of opening and closing the door, but can not meet the function of automatic closure of the door. When users use the refrigerator, the door may not be closed tightly due to a relatively small force applied to the door to close the door, which affects the low temperature effect of the refrigerator.

SUMMARY

The main objective of the present disclosure is to provide a hinge and a refrigeration equipment, aiming to solve the technical problem that doors of the refrigerator cannot be closed automatically.

In order to achieve the above objective, the present disclosure provides a hinge including: a hinge shaft, a first hinge base and a second hinge base. The hinge shaft is vertically arranged. The first hinge base includes a first installation plate and a first sleeve connected to the first installation plate, the first sleeve being sleeved on the hinge shaft and rotatably connected to the hinge shaft to enable the first sleeve to rotate around the hinge shaft, and a lower end of the first sleeve is provided with a first slope sloping downwards. The second hinge base is arranged below the first hinge base and includes a second installation plate and a second sleeve connected to the second installation plate. The second sleeve is sleeved on the hinge shaft and fixed on the hinge shaft, and an upper end of the second sleeve is provided with a second slope sloping upwards, and the second slope is abutted against and cooperated with the first slope, to make the first sleeve being moved from a first position to a second position and away from the second sleeve or from the second position to the first position and close to the second sleeve when the first sleeve rotates around the hinge shaft.

In an embodiment, a lower end of the first slope is provided with a first lower limiting platform, an upper end of the second slope provided with a second upper limiting platform, and the second upper limiting platform is configured to support the first lower limiting platform and confine the second sleeve to the second position.

In an embodiment, an upper end of the first slope is provided with a first upper limiting platform abutted against the second upper limiting platform, a lower end of the second slope is provided with a second lower limiting platform, and the second lower limiting platform is configured to support the first lower limiting platform and confine the second sleeve to the first position.

In an embodiment, an upper end of the first slope is provided with a first upper limiting platform abutted against the second upper limiting platform, a lower end of the second slope is provided with a second lower limiting platform, and the second lower limiting platform is configured to support the first lower limiting platform and confine the second sleeve to the first position.

In an embodiment, the hinge shaft is provided with a first limiting slot, and the first sleeve is provided with a limiting protrusion extended into the first limiting slot to limit the first sleeve.

In an embodiment, a stopper is provided between the first limiting slot and an end of the hinge shaft away from the second sleeve, the stopper is configured to abut against the limiting protrusion, and the first limiting slot is extended from the stopper towards the second sleeve.

In an embodiment, an extension path of the first limiting slot is consistent with an extension path of the second slope, a lower end of the first limiting slot being provided close to the second sleeve, and an upper end of the first limiting slot is connected to the stopper.

In an embodiment, the stopper is provided with a notch for the limiting protrusion to pass through.

In an embodiment, the notch is provided on the stopper close to the upper end of the first limiting slot.

In an embodiment, the hinge shaft includes a guide portion and a limiting portion, a lower end of the guide portion is inserted into the second sleeve and fixed to the second sleeve, and an upper end of the guide portion is connected to a lower end of the limiting portion. An upper end of the limiting portion is connected to the stopper, an overall diameter of the stopper and an overall diameter of the guide portion are larger than an overall diameter of the limiting portion, and the first limiting slot is provided among the stopper, the limiting portion and the guide portion.

In an embodiment, the hinge further includes a first buffer sleeve sleeved on the hinge shaft, the first buffer sleeve is connected to the second installation plate and provided between the first sleeve and the second sleeve, and cylindrical walls of both ends of the first buffer sleeve are respectively configured to abut against the first sleeve and the second sleeve.

In an embodiment, an outer cylindrical wall of the first buffer sleeve is provided with a reinforcement block located between the first installation plate and the second installation plate, and the reinforcement block is provided with an avoidance area for avoiding the first installation plate.

In an embodiment, a side of the reinforcing block facing the avoidance area is provided with a second limiting slot corresponding to the second upper limiting platform, and a groove wall of the second limiting slot is configured to abut against the second installation plate to limit the second installation plate.

In an embodiment, the groove wall of the second limiting slot is provided with a plurality of reinforcing ribs located at intervals along an extension direction of the first buffer sleeve, and a buffer slot is provided between any two adjacent reinforcing ribs.

In an embodiment, a clamping slot is provided on a side of the reinforcement block away from the avoidance area, and the second installation plate is clamped by the clamping slot.

In an embodiment, the hinge further includes a second buffer sleeve sleeved on the hinge shaft and provided between the first sleeve and the first buffer sleeve, an end of the second buffer sleeve being connected to the first sleeve, and another end of the second buffer sleeve is configured to abut against the first buffer sleeve.

In an embodiment, the second slope is an arc-shaped convex surface protruded upwards, and the first slope is an arc-shaped concave surface engagable with the second slope.

The present disclosure provides a refrigeration equipment. The refrigeration equipment includes a refrigerator body, a door and a hinge. The door is hinged on a side of the refrigerator body through the hinge. The hinge includes a hinge shaft, a first hinge base and a second hinge base. The hinge shaft is vertically arranged. The first hinge base includes a first installation plate and a first sleeve connected to the first installation plate, the first sleeve is sleeved on the hinge shaft and rotatably connected to the hinge shaft to enable the first sleeve to rotate around the hinge shaft, and a lower end of the first sleeve is provided with a first slope sloping downwards. The second hinge base is arranged below the first hinge base and includes a second installation plate and a second sleeve connected to the second installation plate. The second sleeve is sleeved on the hinge shaft and fixed on the hinge shaft, an upper end of the second sleeve is provided with a second slope sloping upwards, and the second slope is abutted against and cooperated with the first slope, to make the first sleeve moved from a first position to a second position and away from the second sleeve or from the second position to the first position and close to the second sleeve when the first sleeve rotates around the hinge shaft. The first installation plate is detachably connected to the door, and the second installation plate is detachably connected to the refrigerator body.

In an embodiment, the first installation plate is detachably connected to an inner side wall of the door, the second installation plate is detachably connected to an outer side wall of the refrigerator body, and the hinge shaft is provided outside the refrigerator body and the door.

In an embodiment, an avoidance slot is provided on the door corresponding to the hinge shaft, to avoid the hinge shaft.

In an embodiment, a plurality of hinges provided at intervals along an extension direction of the refrigerator body.

In the technical solution of the present disclosure, the first hinge base, the first hinge base and the hinge shaft are first assembled together along an up-down direction, then the door is hinged to the refrigerator body through the hinge. When the first sleeve is in the first position, the door is closed, and when the first sleeve is in the second position, the door is opened. When the door is pushed by an external force, the first sleeve is rotated around the hinge shaft counterclockwise when viewed from above, and a first slope is cooperated with a second slope, so that the first sleeve rotates and meanwhile moves upwards from the first position to the second position. When the external force is removed, the first sleeve is tended to close the door automatically driven by the gravity of the door, and moves from the second position to the first position to close the door automatically. By a cooperation between the first hinge base and the second hinge base, the hinge of an embodiment enables the refrigeration equipment to avoid a defect that the door cannot close automatically when in use, thus a low temperature effect of the refrigeration equipment is ensured.

BRIEF DESCRIPTION OF THE DRAWINGS

To illustrate the technical solutions according to the embodiments of the present disclosure more clearly, the accompanying drawings for describing the embodiments are introduced briefly in the following. Apparently, the accompanying drawings in the following description are only about some embodiments of the present disclosure, and persons of ordinary skill in the art can derive other drawings from the accompanying drawings without creative efforts.

DESCRIPTION OF REFERENCE NUMBERS

Figure 1:
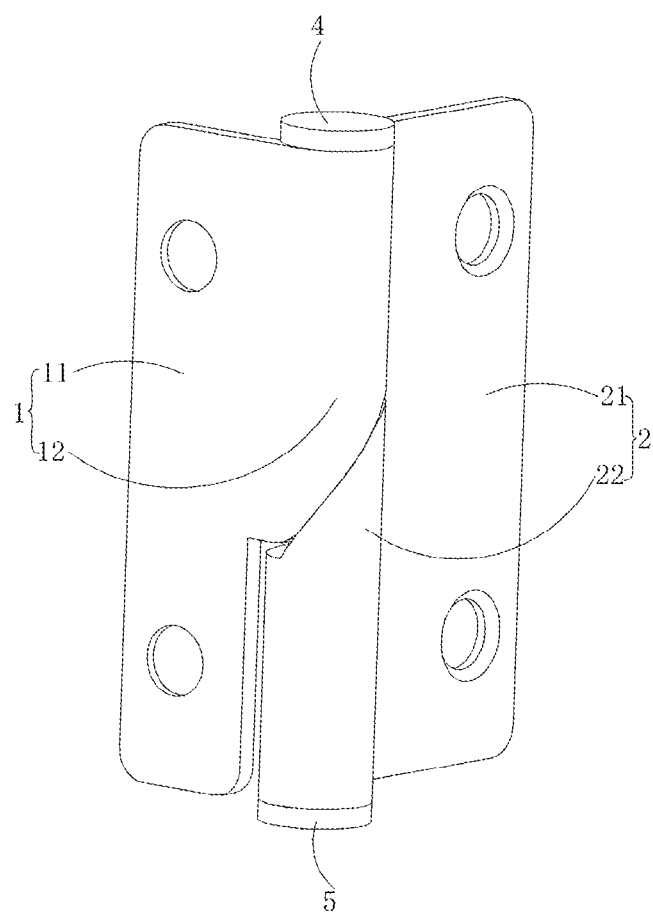
FIG. 1 is a schematic view showing a hinge according to an embodiment of the present disclosure.
Figure 2:
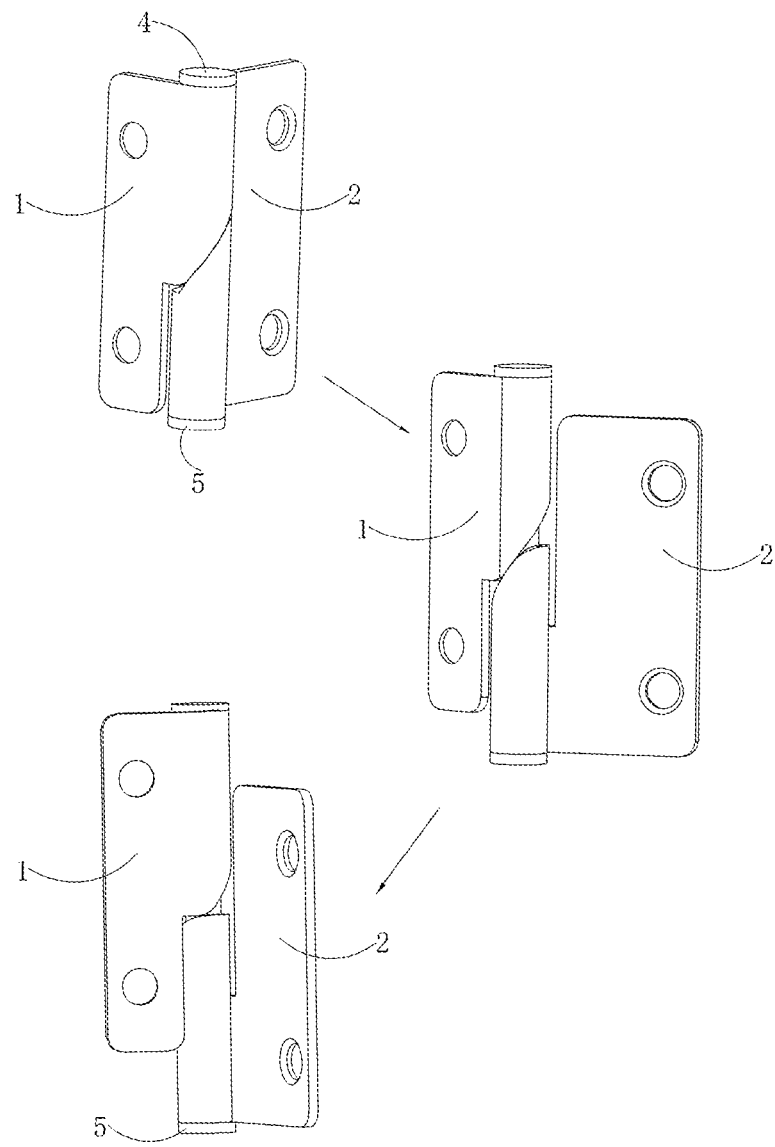
FIG. 2 is a schematic view showing rotation of the hinge according to an embodiment of the present disclosure.
Figure 3:
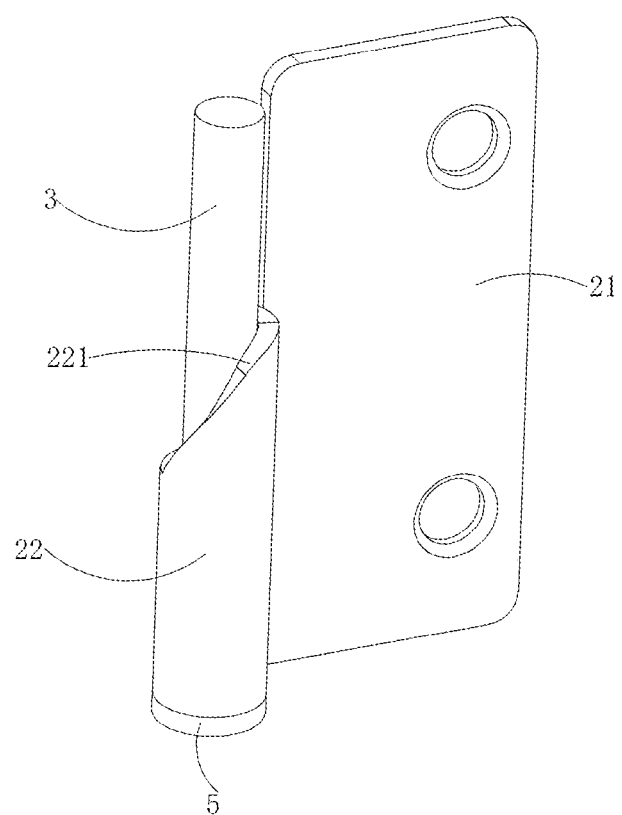
FIG. 3 is a schematic view showing a second hinge base assembled with a hinge shaft according to an embodiment of the present disclosure.
Figure 4:
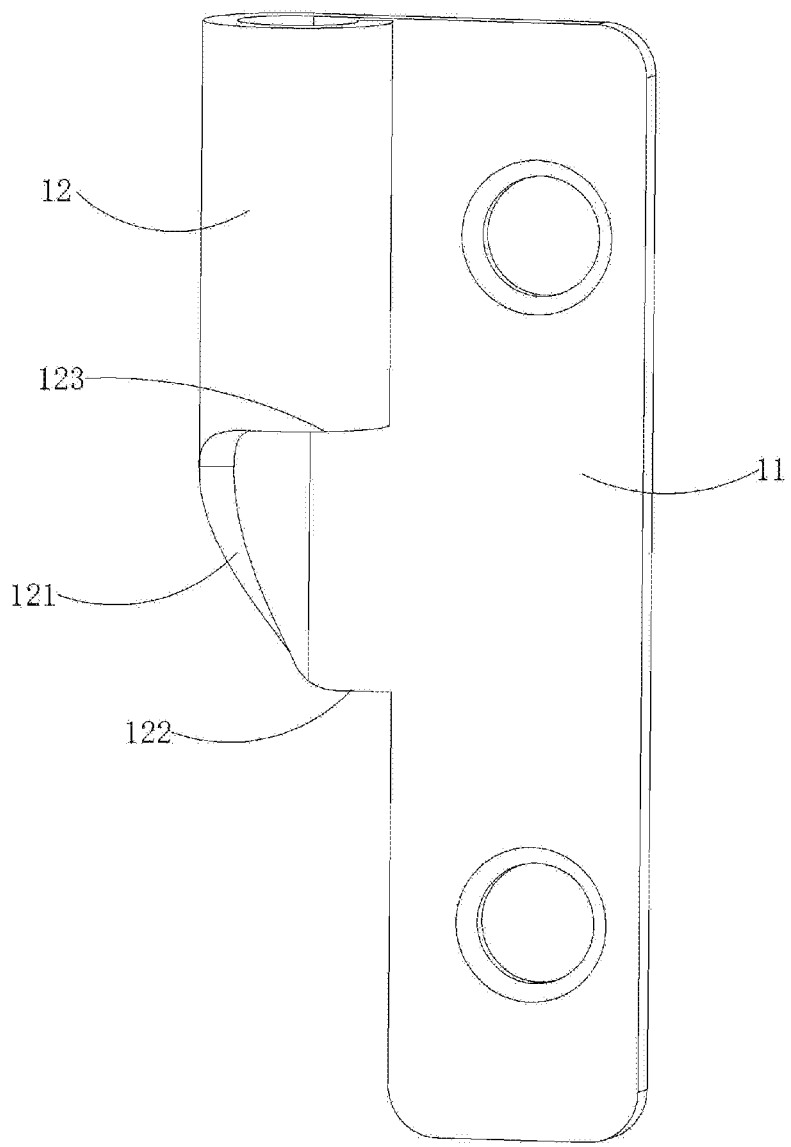
FIG. 4 is a structural schematic view of a first hinge base according to an embodiment of the present disclosure.
Figure 5:
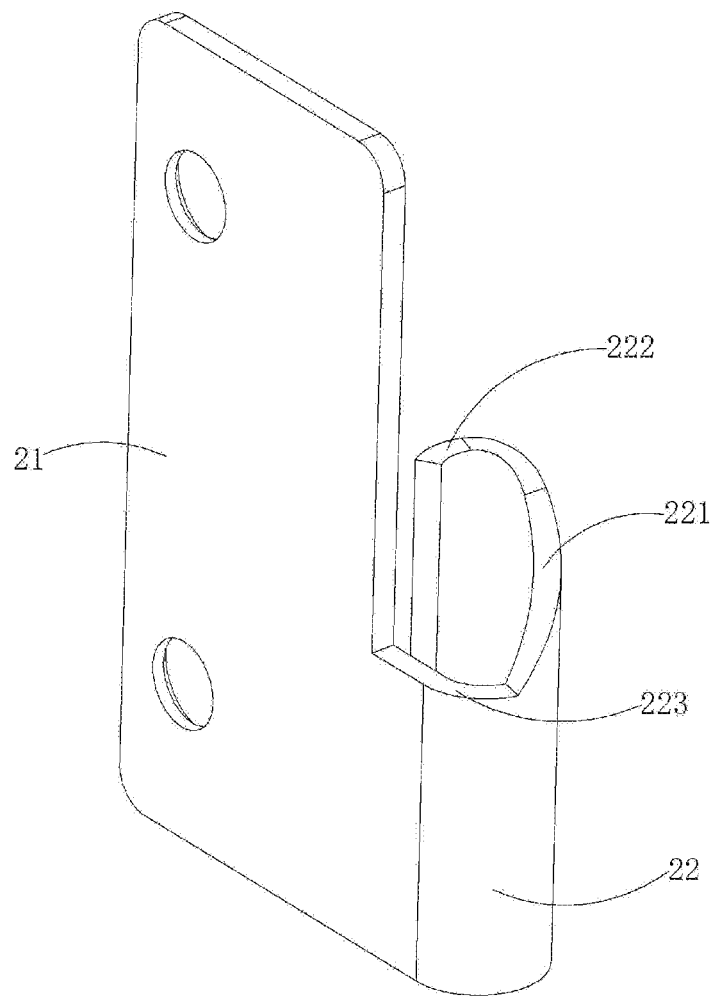
FIG. 5 is a structural schematic view of the second hinge base according to an embodiment of the present disclosure.

| Reference number | Name | Reference number | Name |
|---|---|---|---|
| 100 | hinge | 321 | notch |
| 1 | first hinge base | 33 | guide portion |
| 11 | first installation plate | 34 | limiting portion |
| 12 | first sleeve | 4 | first decorative cover |
| 121 | first slope | 5 | second decorative cover |
| 122 | first lower limiting platform | 6 | first buffer sleeve |
| 123 | first upper limiting platform | 61 | reinforcement block |
| 124 | limiting protrusion | 611 | avoidance area |
| 2 | second hinge base | 612 | second limiting slot |
| 21 | second installation plate | 613 | reinforcing rib |
| 22 | second sleeve | 614 | buffer slot |
| 221 | second slope | 615 | clamping slot |
| 222 | second upper limiting platform | 7 | second buffer sleeve |
| 223 | second lower limiting platform | 200 | refrigeration equipment |
| 3 | hinge shaft | 210 | refrigerator body |
| 31 | first limiting slot | 220 | door |
| 32 | stopper | 2201 | avoidance slot |

The realization of the objective, functional characteristics, and advantages of the present disclosure are further described with reference to the accompanying drawings.

DETAILED DESCRIPTION OF THE EMBODIMENTS

The technical solutions of the embodiments of the present disclosure will be described in detail below with reference to the accompanying drawings. It is obvious that the embodiments described are only some rather than all of the embodiments of the present disclosure. All other embodiments obtained by those skilled in the art based on the embodiments of the present disclosure without creative efforts shall fall within the claimed scope of the present disclosure.

It should be noted that all the directional indications (such as up, down, left, right, front, rear . . . ) in the embodiments of the present disclosure are only used to explain the relative positional relationship, movement, or the like of the components in a certain posture (as shown in the drawings). If the specific posture changes, the directional indication will change accordingly.

Besides, the descriptions associated with, e.g., "first" and "second," in the present disclosure are merely for descriptive purposes, and cannot be understood as indicating or suggesting relative importance or impliedly indicating the number of the indicated technical feature. Therefore, the feature associated with "first" or "second" can expressly or impliedly include at least one such feature. In addition, the technical solutions of the various embodiments can be combined with each other, but the combinations must be based on the realization of those skilled in the art. When the combination of technical solutions is contradictory or cannot be achieved, it should be considered that such a combination of technical solutions does not exist, nor does it fall within the scope of the present disclosure.

Figure 6:
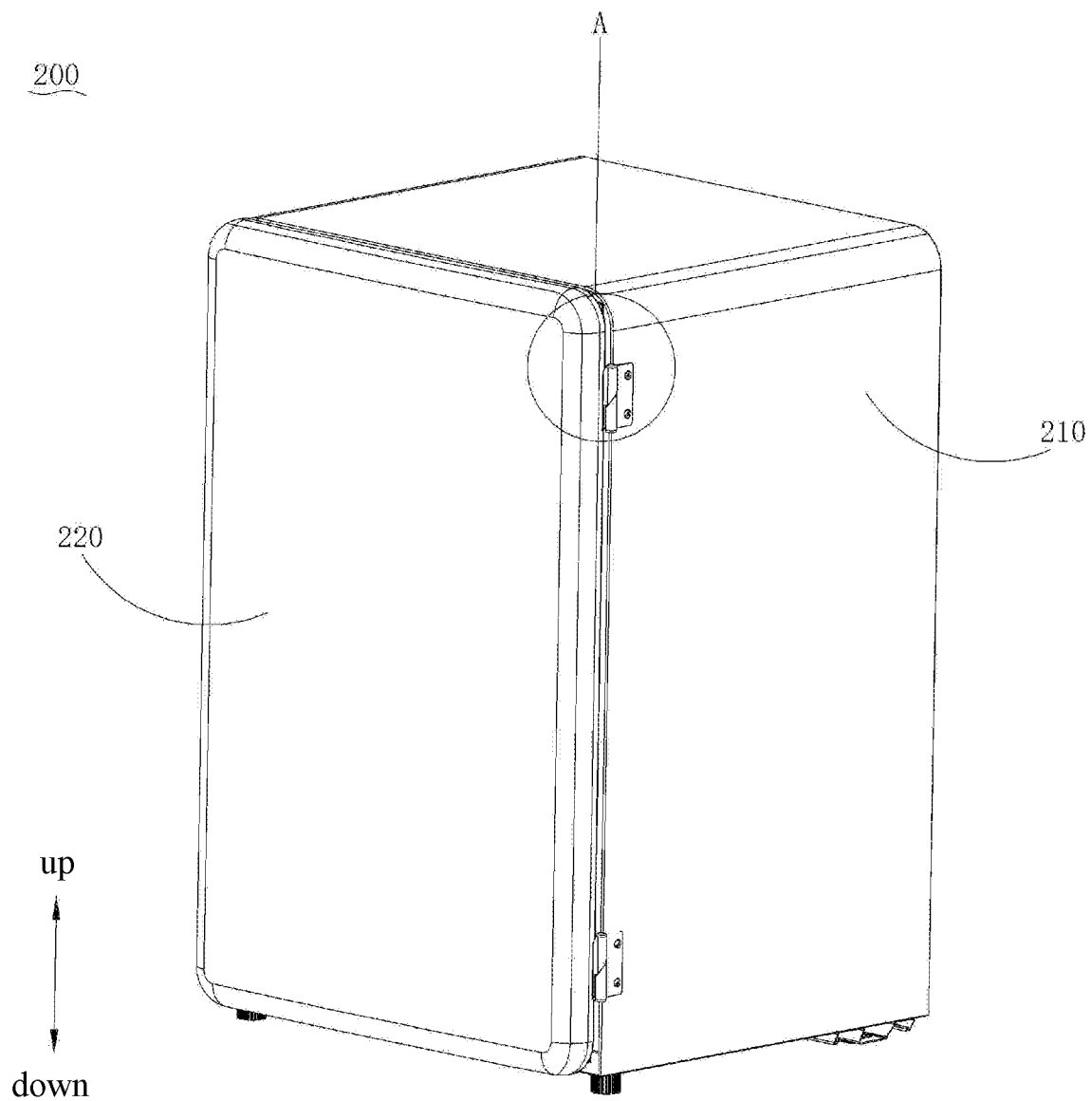
FIG. 6 is a structural schematic view of a refrigeration equipment according to an embodiment of the present disclosure.

The description of the orientations of "up", "down", "left", "right", "front", and "back" are based on the orientations shown in FIG. 6, and are only used to explain the relative position relationship between the devices under the posture shown in FIG. 6. If the specific posture changes, the directional indications also changes accordingly.

The present disclosure provides a hinge.

As shown in FIG. 1, in an embodiment of the present disclosure, a hinge 100 includes a hinge shaft 3, a first hinge base 1, and a second hinge base 2. The hinge shaft 3 is vertically arranged and the first hinge base 1 includes a first installation plate 11 and a first sleeve 12 connected to the first installation plate 11. The first sleeve 12 is sleeved on the hinge shaft 3 and rotatably connected to the hinge shaft 3, to enable the first sleeve 12 to rotate around the hinge shaft 3. A lower end of the first sleeve 12 is provided with a first slope 121 sloping downwards. The second hinge base 2 is arranged below the first hinge base 1. The second hinge base 2 includes a second installation plate 21 and a second sleeve 22 connected to the second installation plate 21. The second sleeve 22 is sleeved on the hinge shaft 3 and fixed on the hinge shaft 3. An upper end of the second sleeve 22 is provided with a second slope 221 sloping upwards. The second slope 221 is abutted against and cooperated with the first slope 121, so that when the first sleeve 12 rotates around the hinge shaft 3, the first sleeve 12 is moved from a first position to a second position and away from the second sleeve 22 or from the second position to the first position and close to the second sleeve 22.

In an embodiment, the first hinge base 1 and the second hinge base 2 can be sheet metal parts, or be made through injection molding or other methods. An inner diameter of the first sleeve 12 is larger than that of the second sleeve 22, to facilitate the assembling of the hinge 100. The hinge 100 of an embodiment is mainly used in refrigeration equipment 200, such as refrigerators, freezers, wine cabinets, or the like, and the hinge 100 is configured to hinge a door 220 of a refrigeration equipment 200 to a refrigerator body 210 of the refrigeration equipment 200.

When the refrigeration equipment 200 of an embodiment needs to be assembled, the second sleeve 22 is first sleeved on the hinge shaft 3, and then the second sleeve 22 is fixed on the hinge shaft 3 through an interference fit or etching on a surface of hinge shaft 3. Then the first sleeve 12 is sleeved on the hinge shaft 3, so that the first sleeve 12 and the second sleeve 22 are sequentially provided on the hinge shaft 3 along an extension direction of the hinge shaft 3. The second installation plate 21 is connected to the refrigerator body 210, and the door 220 is connected to the first installation plate 11, to make the door 220 hinged on the refrigerator body 210. The door 220 can be pushed by an external force to drive the first sleeve 12 connected to the door 220 to rotate around the hinge shaft 3, thereby to rotate the door 220 around the hinge 100 and open or close the refrigerator body 210. In an embodiment, it only needs to sleeve the first hinge base 1 and the second hinge base 2 on the hinge shaft 3 to finish the assembling of the hinge 100, which not only omit a number of parts such as springs and shaft sleeves, but also reduces the assembling processes of the hinge 100 and improves the production efficiency of the hinge 100.

The first hinge base 1, the first hinge base 1 and the hinge shaft 3 are first assembled together along an up-down direction, then the door 220 is hinged to the refrigerator body 210 through the hinge 100. When the first sleeve 12 is in the first position, the door 220 is closed, and when the first sleeve 12 is in the second position, the door 220 is opened. When the door 220 is pushed by an external force, the first sleeve 12 is rotated around the hinge shaft 3 counterclockwise when viewed from above, and the first slope 121 is cooperated with the second slope 221, so that the first sleeve 12 rotates and meanwhile moves upwards from the first position to the second position. When the external force is removed, driven by the gravity of the door 220, the first sleeve 12 is tended to close the door automatically, and moves from the second position to the first position to close the door 220 automatically. By a cooperation between the first hinge base 1 and the second hinge base 2, the hinge 100 of an embodiment enables the refrigeration equipment 200 to avoid a defect that the door cannot close automatically when in use, thus a low temperature effect of the refrigeration equipment 200 is ensured.

In an embodiment, a lower end of the first slope 121 is provided with a first lower limiting platform 122, and an upper end of the second slope 221 is provided with a second upper limiting platform 222. The second upper limiting platform 222 is configured to support the first lower limiting platform 122 and confine the second sleeve 22 to the second position.

When the door 220 in a closed state is pushed counter-clockwise by an external force, the first sleeve 12 rotates around the hinge shaft 3 and meanwhile moves upwards. When the first sleeve 12 is rotated to a preset angle, the first sleeve 12 is moved from the first position to the second position, and the second upper limiting platform 222 of the second sleeve 22 supports the first lower limiting platform 122 of the first sleeve 12 through a plane, to prevent the first sleeve 12 from sliding down by gravity of the door 220 to close the door, and keep the door 220 to be opened. In a preferred embodiment, to facilitate the users to open the door 220, a height of the second slope 221 is 22.4 mm, and the preset angle is at least 90° and not more than 180°. In an embodiment, through the cooperation of the first slope 121 with the second slope 221, and the cooperation of the first lower limiting platform 122 with the second upper limiting platform 222, the door 220 can not only be closed automatically, but also be hovered after being rotated to the preset angle.

It should be noted that the upper end of the first slope 121 is provided with a first upper limiting platform 123 abutted against the second upper limiting platform 222, and a lower end of the second slope 221 is provided with a second lower limiting platform 223. The second lower limiting platform 223 is configured to support the first lower limiting platform 122 and confine the second sleeve 22 to the first position. When the door 220 is in the closed state, the second lower limiting platform 223 supports the first lower limiting platform 122 through a plane, the second upper limiting platform 222 supports the first upper limiting platform 123 through a plane, and the first sleeve 12 is confined to the first position, thereby the closed state of the door 220 is stable and the low temperature effect of the refrigeration equipment 200 is improved.

Figure 8:
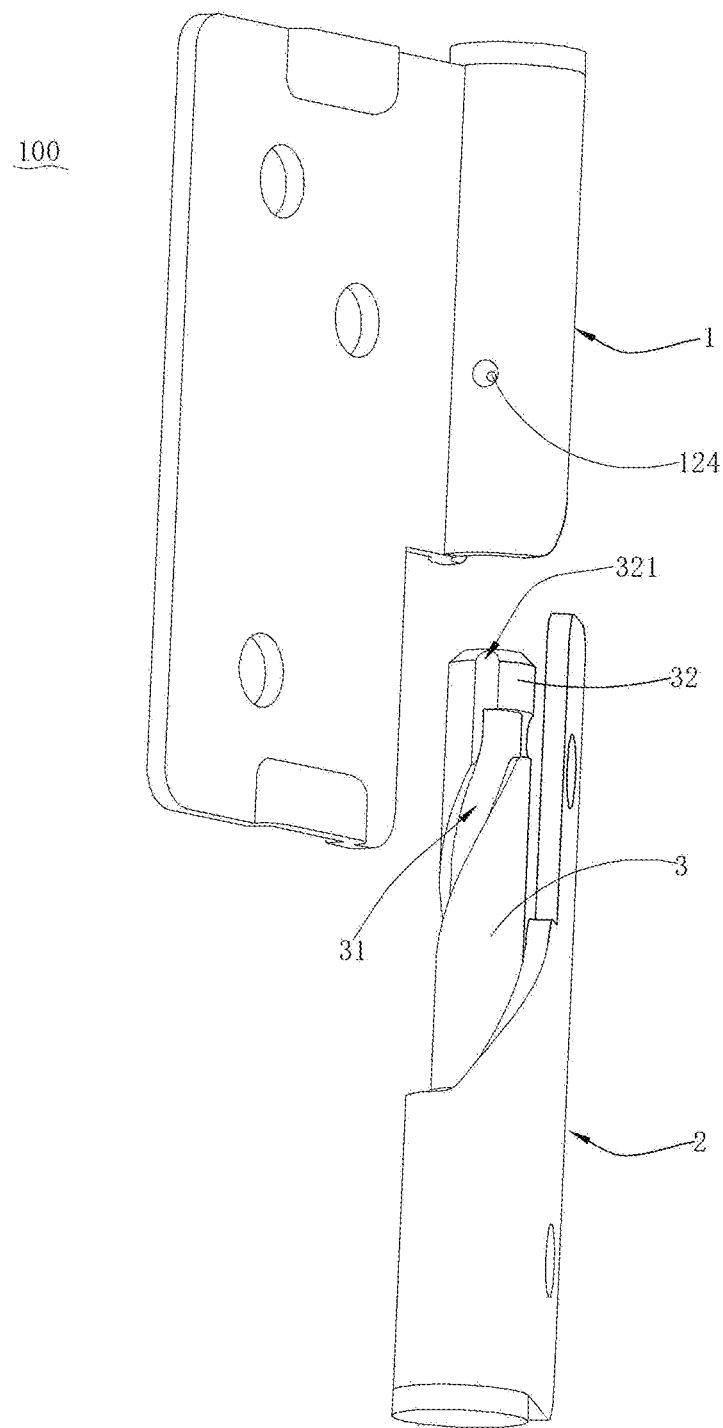
FIG. 8 is an exploded view of the hinge according to an embodiment of the present disclosure.
Figure 9:
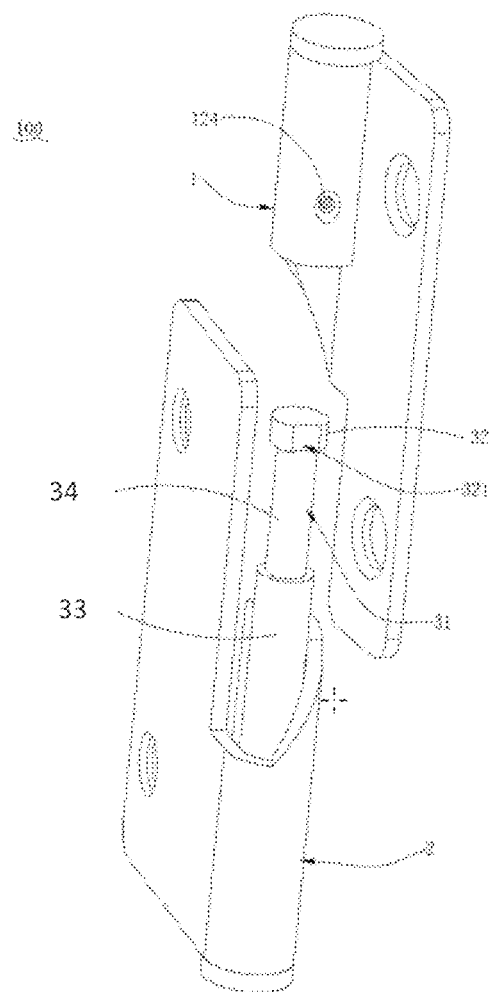
FIG. 9 is an exploded view of the hinge according to another embodiment of the present disclosure.

As shown in FIG. 8 and FIG. 9, in an embodiment, a first limiting slot 31 is provided on the hinge shaft 3 by cutting or laser marking. The first sleeve 12 is provided with a limiting protrusion 124 corresponding to the first limiting slot 31. The limiting protrusion 124 is extended into the first limiting slot 31 to limit the first sleeve 12. When the hinge 100 is used, the first sleeve 12 and the second sleeve 22 can be relatively rotated in a horizontal plane, to realize the opening and closure of the hinge 100. The first limiting slot 31 abuts against the limiting protrusion 124 and limits the limiting protrusion 124, to prevent the second sleeve 22 from being separated from the first sleeve 12 along the extension direction of the hinge shaft 3, which not only ensures a normal use of the hinge 100, but also improves a structural stability of the hinge 100. In an embodiment, the hinge shaft 3, the first hinge base 1 and the second hinge base 2 cooperate with each other, which can facilitate the assembling of the hinge 100, prevent the first sleeve 12 and the second sleeve 22 from being separated from each other, and improve the structural stability of the hinge 100.

In an embodiment, the limiting protrusion 124 is integrally formed with the first sleeve 12, or the limiting protrusion 124 is detachably connected to the first sleeve 12. In an embodiment, an outer cylinder wall of the first sleeve 12 is protruded inwardly to form the limiting protrusion 124, to integrate the limiting protrusion 124 with the first sleeve 12, which can omit the assembling process of assembling the first sleeve 12 and the limiting protrusion 124 together. In another embodiment, the limiting protrusion 124 is a screw. By driving the screw inwards, the limiting protrusion 124 is passed through the first sleeve 12 and inserted in the first limiting slot 31, which facilitates the acquisition of parts and the assembling of the limiting protrusion 124 with the first sleeve 12.

In addition, to facilitate the manufacturing of the hinge shaft 3, a stopper 32 is provided between the first limiting slot 31 and an end of the hinge shaft 3 away from the second sleeve 22, and the stopper 32 is configured to abut against the limiting protrusion 124. The first limiting slot 31 is extended from the stopper 32 towards the second sleeve 22. In an embodiment, the hinge shaft 3 is extended along an up-down direction. The first sleeve 12 is provided above the second sleeve 22. An upper end of the hinge shaft 3 is provided with the stopper 32, and the first limiting slot 31 is extended from up to down. When the first sleeve 12 is pulled upwards, the stopper 32 is abutted against the limiting protrusion 124 to prevent the first sleeve 12 from being separated from the second sleeve 22.

As shown in FIG. 8, in an embodiment, an extension path of the first limiting slot 31 is consistent with an extension path of the second slope 221. A lower end of the first limiting slot 31 is provided close to the second sleeve 22, and an upper end of the first limiting slot 31 is connected to the stopper 32. In an embodiment, the first limiting slot 31 is extended around an outer wall of the hinge shaft 3 and meanwhile upwards. The hinge 100 is opened by an external force, and the first sleeve 12 and the second sleeve 22 are away from each other in a vertical direction. Furthermore, the extension paths of the first limiting slot 31 and the second slope 221 are consistent, which can ensure that the limiting protrusion 124 is always in the first limiting slot 31 and the first sleeve 12 is limited by the limiting protrusion 124. Therefore, the first sleeve 12 and the second sleeve 22 are prevented from being separated from each other, and always abutted against each other and engaged with each other.

As shown in FIG. 8 and FIG. 9, the stopper 32 in an embodiment is provided with a notch 321 for the limiting protrusion 124 to pass through. In addition, the notch 321 in an embodiment is provided on the stopper close to the upper end of the first limiting slot 31. The stopper 32 in an embodiment is shaped as a disk, and the notch 321 is provided on an edge of the stopper 32. When to assemble the first hinge base 1 and the second hinge base 2 together, the first sleeve 12 and the second sleeve 22 can be rotated relative to each other to a specified angle to make the limiting protrusion 124 face the notch 321, and then the first sleeve 12 and the second sleeve 22 can be moved close to each other to insert the limiting protrusion 124 in the first limiting slot 31 through the notch 321. Thus the assembling of the first hinge base 1 with the second hinge base 2 is finished, which facilitates the assembling of the hinge 100. The first sleeve 12 and the second sleeve 22 can be rotated relative to each other further, so that the limiting protrusion 124 and the notch 321 are misaligned with each other, the first limiting slot 31 can abut against the limiting protrusion 124 to ensure the structural stability of the hinge 100. When the hinge 100 needs to be disassembled, the first sleeve 12 and the second sleeve 22 can be rotated relative to each other to the specified angle to make the limiting protrusion 124 face the notch 321, and the first sleeve 12 and the second sleeve 22 can be moved away from each other to separate the limiting protrusion 124 from the first limiting slot 31 through the notch 321. Thus the second sleeve 22 can be released from the first limiting slot 31, and the assembling of the hinge 100 can be facilitated.

As shown in FIG. 9, in another embodiment, the hinge shaft 3 includes a guide portion 33 and a limiting portion 34. A lower end of the guide portion 33 is inserted into the second sleeve 22 and fixed to the second sleeve 22, and an upper end of the guide portion 33 is connected to a lower end of the limiting portion 34. An upper end of the limiting portion 34 is connected to the stopper 32. Furthermore, an overall diameter of the stopper 32 and an overall diameter of the guide portion 33 are larger than an overall diameter of the limiting portion 34, and thus the first limiting slot 31 is provided among the stopper 32, the limiting portion 34 and the guide portion 33. In an embodiment, a length of the limiting portion 34 is equal to the height of the second slope 221. When the first sleeve 12 is rotated relative to the second sleeve 22, the limiting protrusion 124 can always be in the limiting slot to limit the second sleeve 22 and prevent the first sleeve 12 and the second sleeve 22 from being separated from each other.

Figure 10:
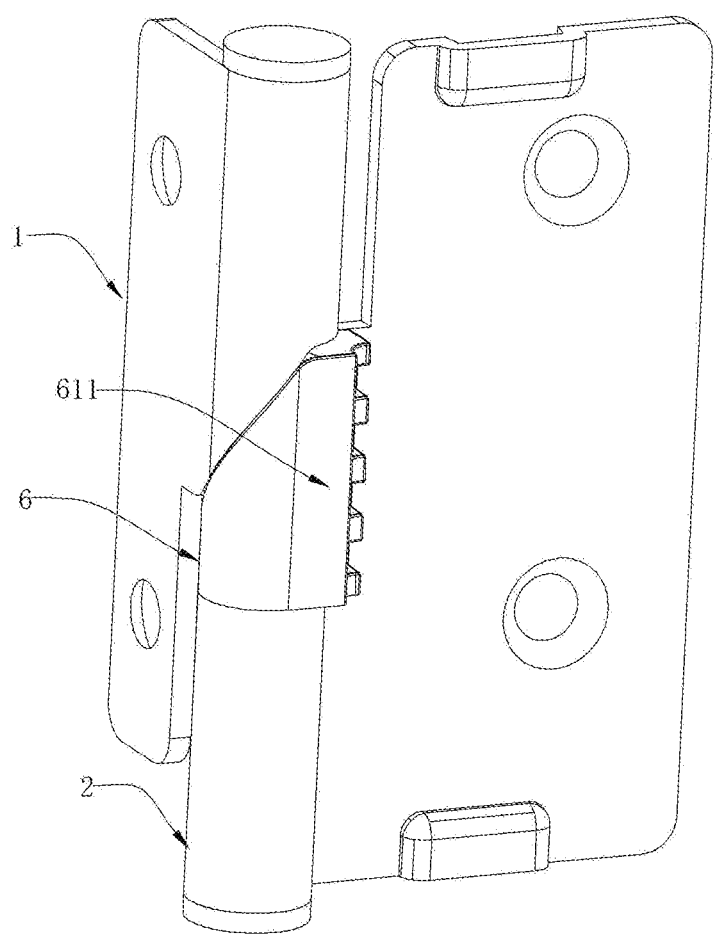
FIG. 10 is a schematic view of the hinge in one state according to an embodiment of the present disclosure.
Figure 11:
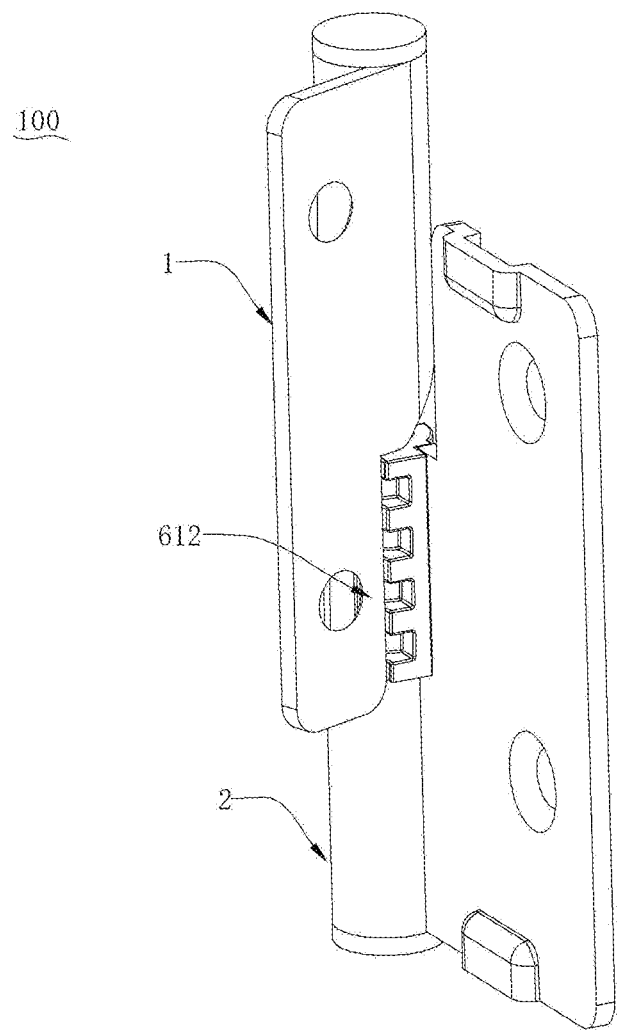
FIG. 11 is a schematic view of the hinge in another state according to an embodiment of the present disclosure.

In an embodiment, the hinge 100 further includes a first buffer sleeve 6 sleeved on the hinge shaft 3. The first buffer sleeve 6 is connected to the second installation plate 21 and provided between the first sleeve 12 and the second sleeve 22. Furthermore, cylindrical walls of both ends of the first buffer sleeve 6 are respectively configured to abut against the first sleeve 12 and the second sleeve 22. It can be understood that, as shown in FIG. 10 and FIG. 11, the second slope 221 is provided on an upper end of the first buffer sleeve 6 in an embodiment. During a process of closing or opening the hinge 100, the first buffer sleeve 6 provided between the first sleeve 12 and the second sleeve 22 can play a buffer function, to avoid abnormal noise generated due to poor mating surfaces during the relative rotation between the first sleeve 12 and the second sleeve 22. In an embodiment, the first hinge base 1, the second hinge base 2 and the first buffer sleeve 6 of the hinge 100 engage with each other to simplify assembling structures of the hinge 100, reduce the noise of the hinge 100, and make the opening and closing the hinge 100 smoother.

In addition, an outer cylindrical wall of the first buffer sleeve 6 is provided with a reinforcement block 6, and the reinforcement block 61 is located between the first installation plate 11 and the second installation plate 21. The reinforcement block 61 is provided with an avoidance area 611 for avoiding the first installation plate 11. In an embodiment, by providing the reinforcement block 61, a structural strength of the first buffer sleeve 6 is improved to enhance a structural stability and a use stability of the hinge 100. As shown in FIG. 10, during rotation, the first installation plate 11 is resisted by the reinforcement block 61 and inclined on a side of the reinforcement block 61 facing the first installation plate 11, to form the avoidance area 611 to avoid the first installation plate 11. Therefore, not only the structural strength of the hinge 100 is enhanced, but also the hinge 100 can be opened and closed smoothly.

In an embodiment, a side of the reinforcing block 61 facing the avoidance area 611 is provided with a second limiting slot 612 corresponding to the second upper limiting platform 222. A groove wall of the second limiting slot 612 is configured to abut against the second installation plate 21 to limit the second installation plate 21. When the second buffer sleeve 7 is rotated up to the second position relative to the first buffer sleeve 6, the first installation plate 11, driven by the second buffer sleeve 7, is rotated relative to the second installation plate 21 and moved into the second limiting slot 612. The groove wall of the second limiting slot 612 is abutted against the first installation plate 11 to realize the position limiting of the first installation plate 11, and avoid the excessive rotation of the first installation plate 11. As shown in FIG. 11, the second limiting slot 612 in an embodiment is arc-shaped. An extension direction of the second limiting slot 612 is consistent with an extension direction of the first installation plate 11. Furthermore, a length of the second limiting slot 612 is equal to a length of the first installation plate 11.

The groove wall of the second limiting slot 612 in an embodiment is provided with a plurality of reinforcing ribs 613, and the plurality of reinforcing ribs 613 are located at intervals along an extension direction of the first buffer sleeve 6, furthermore, a buffer slot 614 is provided between any two adjacent reinforcing ribs 613. In an embodiment, the structural strength of the first buffer sleeve 6 is further improved by the plurality of reinforcing ribs 613. The reinforcing ribs 613 in an embodiment are configured to abut against the first installation plate 11. When the first installation plate 11 is rotated into the second limiting slot 612 and abutted against the reinforcing ribs 613, the buffer slot 614 can be deformed to absorb the impact of the first installation plate 11 on a reinforcing plate and prevent the first buffer sleeve 6 from being damaged due to the impact of the first installation plate 11, which can further improve the structural strength of the hinge 100.

It should be noted that an upper end of the first sleeve 12 is covered with a first decorative cover 4, and a lower end of the second sleeve 22 is covered with a second decorative cover 5. During use of the hinge 100, the first decorative cover 4 and the second decorative cover 5 can prevent sundries from extending into the first sleeve 12 or the second sleeve 22 and affecting the normal operation of the hinge 100.

In an embodiment, a clamping slot 615 is provided on a side of the reinforcement block 61 away from the avoidance area 611, and the second installation plate 21 is clamped by the clamping slot 615. A left side of the reinforcement block 61 is provided with the avoidance area 611 to avoid the first installation plate 11 by utilizing an inclined surface. A right side of the reinforcement block 61 is provided with the clamping slot 615 clamped with the second installation plate 21. After the hinge shaft 3 is fixed on the second sleeve 22, the first buffer sleeve 6 is sleeved on the hinge shaft 3 and abutted against the first sleeve 12. Meanwhile the second installation plate 21 can be clamped by the clamping slot 615. After being clamped and limited by the second installation plate 21, the first buffer sleeve 6 can be prevented from rotating relatively to the second sleeve 22, thus the assembling of the hinge 100 can be facilitated.

Figure 12:
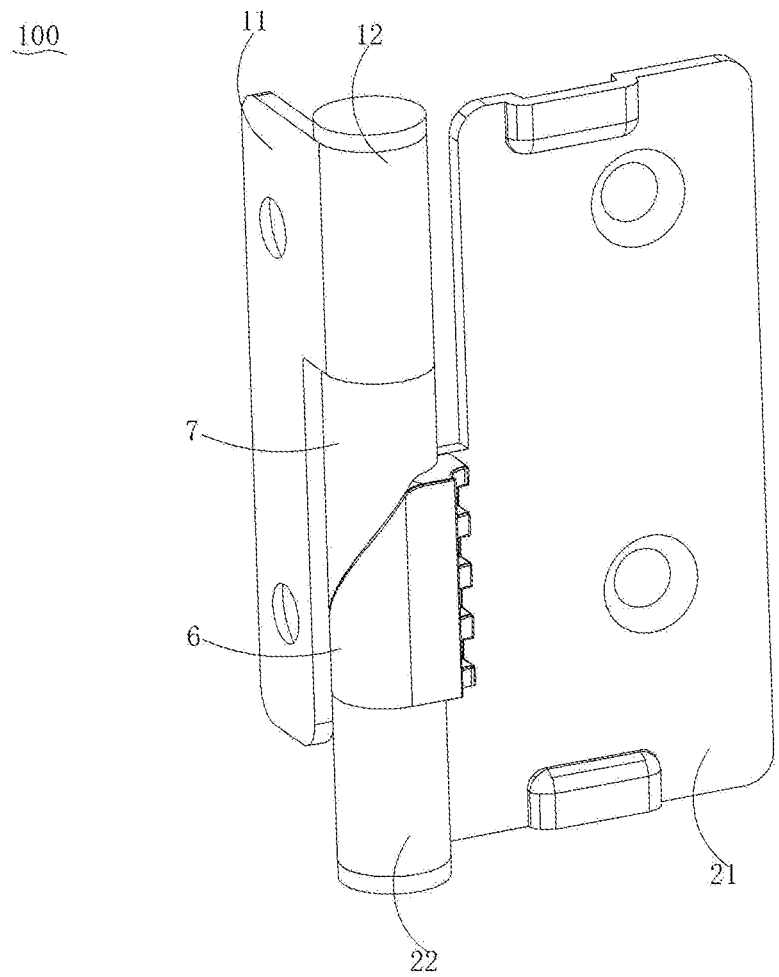
FIG. 12 is a structural schematic view of the hinge according to another embodiment of the present disclosure.
Figure 13:
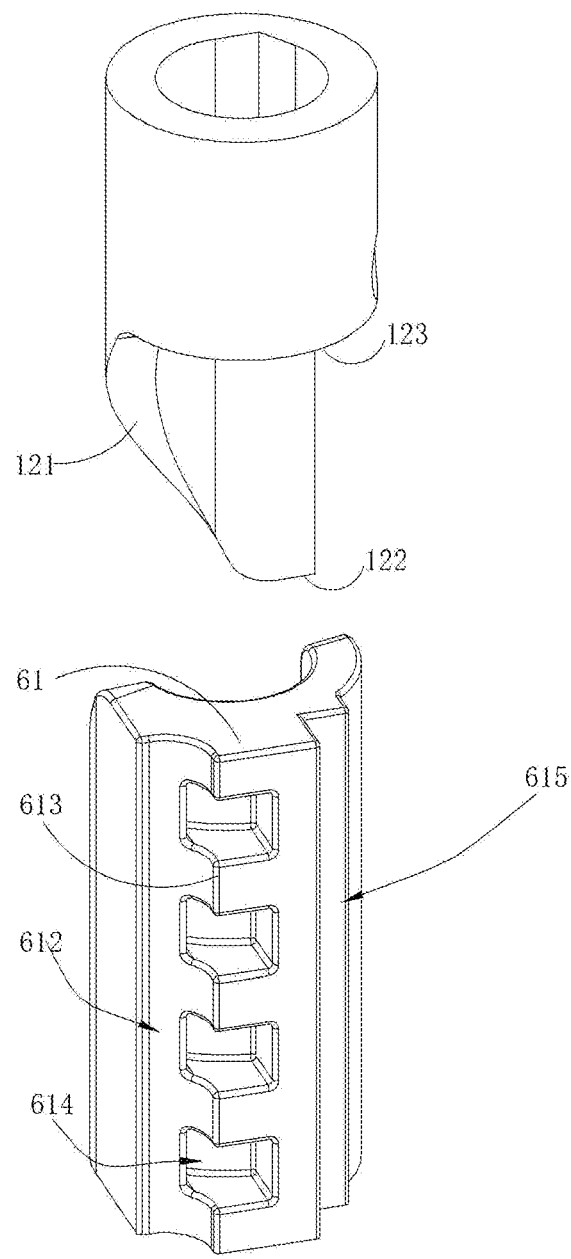
FIG. 13 is a structural schematic view showing a part of the hinge according to an embodiment of the present disclosure.

As shown in FIG. 12 and FIG. 13, in an embodiment, the hinge 100 further includes a second buffer sleeve 7 sleeved on the hinge shaft 3. The second buffer sleeve 7 is provided between the first sleeve 12 and the first buffer sleeve 6. One end of the second buffer sleeve 7 is connected to the first sleeve 12, and the other end of the second buffer sleeve 7 is configured to abut against the first buffer sleeve 6. Both the first buffer sleeve 6 and the second buffer sleeve 7 in an embodiment can be plastic products that are molded, and an upper end of the second buffer sleeve 7 can be clamped with the first second-sleeve 2212. It can be understood that, in another embodiment, the first slope 121 is provided on the second buffer sleeve 7, and the second slope 221 is provided on the first buffer sleeve 6. In an embodiment, the first sleeve 12, the second buffer sleeve 7, the first buffer sleeve 6 and the second sleeve 22 are sequentially sleeved on the hinge shaft 3 along the up-down direction. During the rotation of the second sleeve 22 relative to the first sleeve 12, the first installation plate 11 and the second installation plate 21 are opened or closed, the first buffer sleeve 6 is connected to and fixed on the second installation plate 21, and the second buffer sleeve 7 is connected to the first sleeve 12 and follows the first sleeve 12 to rotate relative to the first buffer sleeve 6. The first sleeve 12 is not directly connected to the second sleeve 22, and a buffer effect is improved through a cooperation between the first buffer sleeve 6 and the second buffer sleeve 7, which further reduce the noise of the hinge 100.

As shown in FIG. 1, an outer diameter of the first sleeve 12 is equal to an outer diameter the second sleeve 22, which makes a cooperation between the first sleeve 12 and the second sleeve 22 tighter, and facilitates production and assembling of the first sleeve 12 and the second sleeve 22. In the hinge 100 of an embodiment, the second slope 221 is an arc-shaped convex surface which is protruded upwards. The first slope 121 is an arc-shaped concave surface engagable with the second slope 221. When the first sleeve 12 is rotated around the hinge shaft 3, the arc-shaped convex surface of the second slope 221 is engaged with the arc-shaped concave surface of the first slope 121 to make the door 220 and the first sleeve 12 slowly raised along the hinge shaft 3, which prevents the door 220 and the first sleeve 12 from dropping or rising suddenly and improves the users' experience.

To improve an aesthetic appearance of the hinge 100, the upper end of the first sleeve 12 is provided with the first decorative cover 4, and the lower end of the second sleeve 22 is provided with the second decorative cover 5. In addition, the first decorative cover 4 and the second decorative cover 5 also prevents sundries from extending into the first sleeve 12 or the second sleeve 22 to affect the normal operation of the hinge 100.

The present disclosure provides a refrigeration equipment 200 including the refrigerator body 210, the door 220 and the hinge 100 as mentioned above. The door 220 is hinged on a side of the refrigerator body 210 through the hinge 100. The first installation plate 11 is detachably connected to the door 220, and the second installation plate 21 is detachably connected to the refrigerator body 210. A specific structure of the hinge 100 can make reference to the above-mentioned embodiments. Since the refrigeration equipment 200 adopts all the technical solutions of all the above-mentioned embodiments, it has at least all the effects of the technical solutions of the above-mentioned embodiments, which will not be repeated here.

In an embodiment, the first installation plate 11 is detachably connected to an inner side wall of the door 220, and the second installation plate 21 is detachably connected to an outer side wall of the refrigerator body 210. The hinge shaft 3 is provided outside the refrigerator body 210 and the door 220. When to assemble the refrigeration equipment 200 in an embodiment, the first hinge base 1, the second hinge base 2 and the hinge shaft 3 are first assembled into the hinge 10.

Then screws are used to connect the second installation plate 21 with the outer side wall of the refrigerator body 210, and connect the first installation plate 11 with the inner side wall of the door 220. As shown in FIG. 6, in this case, the hinge shaft 3 is provided outside the refrigerator body 210 and the door 220, instead of between the door 220 and the refrigerator body 210. Therefore, edges of a door seal are prevented from being wrung, and both the sealing effect of the door seal and the cooling effect of the refrigeration equipment 200 improved.

Figure 7:
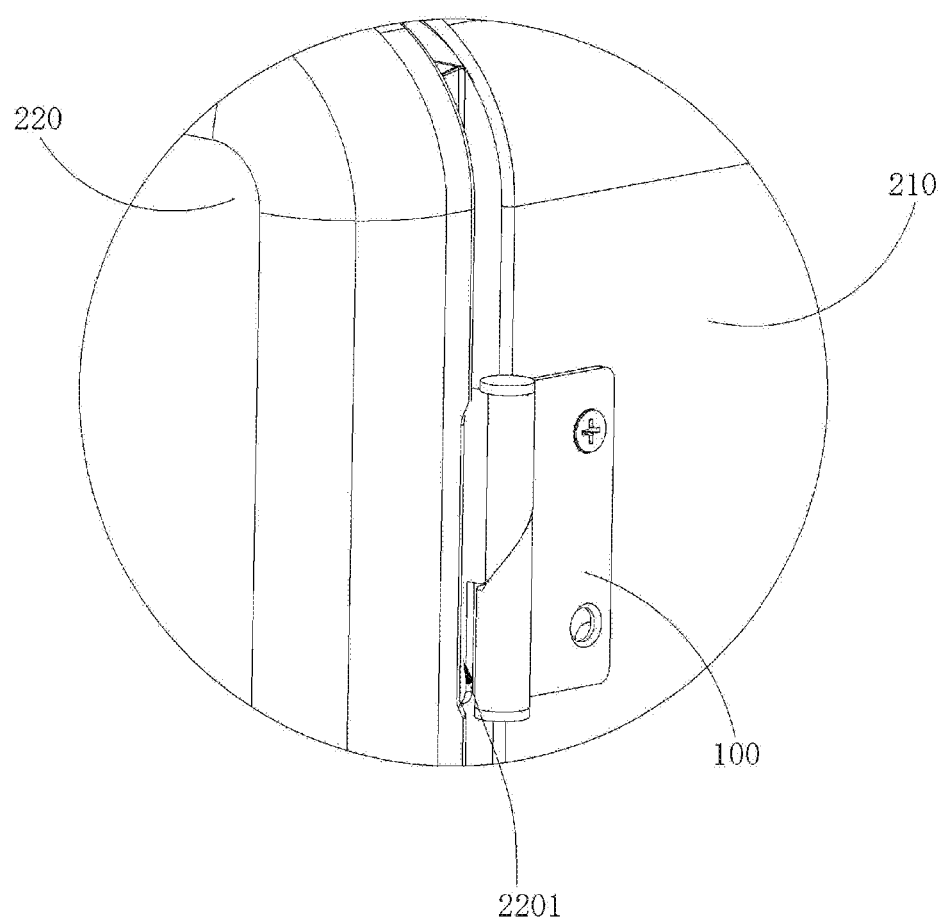
FIG. 7 is an enlarged view of portion A shown in FIG. 6.

As shown in FIG. 7, to facilitate the rotation of the hinge shaft 3, an avoidance slot 2201 is provided on the door 220 corresponding to the hinge shaft 3, to avoid the hinge shaft 3. The hinge shaft 3 is provided inside the avoidance slot 2201, which can further improve a structural compactness of the refrigeration equipment 200. The number of hinges 100 in an embodiment is multiple, and the multiple hinges 100 are provided at intervals along an extension direction of the refrigerator body 210. When to assemble the refrigerator body 210 and the door 220 of the refrigeration equipment 200 together, the plurality of hinges 100 are sequentially assembled between the door 220 and the refrigerator body 210 along the up-down direction. As shown in FIG. 6, the refrigeration equipment 200 in an embodiment is provided with two hinges 100, one of which is provided close to a top of the refrigerator body 210, and the other hinge 100 is provided close to a bottom of the refrigerator body 210.

The above are only preferred embodiments of the present disclosure and are not to limit the scope of the present disclosure. Under the concept of the present disclosure, any equivalent structural transformations made by using the contents of the description and drawings of the present disclosure, or any direct or indirect application to other related technical fields is included in the scope of the claims.

What is claimed is:

1. A hinge, comprising: a hinge shaft, a first hinge base, and a second hinge base, wherein:
    the hinge shaft is vertically arranged;
    the first hinge base includes a first installation plate and a first sleeve coupled to the first installation plate, wherein the first sleeve is sleeved on the hinge shaft and rotatably coupled to the hinge shaft to enable the first sleeve to rotate around the hinge shaft, and a lower end of the first sleeve is provided with a first slope sloping downwards; and
    the second hinge base is arranged below the first hinge base and includes a second installation plate and a second sleeve coupled to the second installation plate, wherein:
    the second sleeve is sleeved on the hinge shaft and fixed on the hinge shaft; and
    an upper end of the second sleeve is provided with a second slope sloping upwards, and when the first sleeve rotates around the hinge shaft, the second slope is abutted against and cooperated with the first slope to make the first sleeve being moved from a first position to a second position and away from the second sleeve or from the second position to the first position and close to the second sleeve,
    wherein:
    the hinge shaft is provided with a first limiting slot; and
    the first sleeve is provided with a limiting protrusion extended into the first limiting slot to limit the first sleeve.

2. The hinge of claim 1, wherein:
    a lower end of the first slope is provided with a first lower limiting platform;

an upper end of the second slope is provided with a second upper limiting platform; and the second upper limiting platform is configured to support the first lower limiting platform and confine the second sleeve to the second position.

3. The hinge of claim 2, wherein:

an upper end of the first slope is provided with a first upper limiting platform abutted against the second upper limiting platform;

a lower end of the second slope is provided with a second lower limiting platform; and the second lower limiting platform is configured to support the first lower limiting platform and confine the second sleeve to the first position.

4. The hinge of claim 1, wherein a stopper is provided between the first limiting slot and an end of the hinge shaft distal from the second sleeve, the stopper being configured to abut against the limiting protrusion, and the first limiting slot is extended from the stopper towards the second sleeve.

5. The hinge of claim 4, wherein an extension path of the first limiting slot is consistent with an extension path of the second slope, a lower end of the first limiting slot being provided adjacent to the second sleeve, and an upper end of the first limiting slot is coupled to the stopper.

6. The hinge of claim 5, wherein the stopper is provided with a notch for the limiting protrusion to pass through.

7. The hinge of claim 6, wherein the notch is provided on the stopper adjacent to the upper end of the first limiting slot.

8. The hinge of claim 4, wherein:

the hinge shaft comprises a guide portion and a limiting portion;

a lower end of the guide portion is inserted into the second sleeve and fixed to the second sleeve, and an upper end of the guide portion is coupled to a lower end of the limiting portion;

an upper end of the limiting portion is coupled to the stopper; and an overall diameter of the stopper and an overall diameter of the guide portion are larger than an overall diameter of the limiting portion, and the first limiting slot is provided among the stopper, the limiting portion and the guide portion.

9. The hinge of claim 2, wherein:

the hinge further comprises a first buffer sleeve sleeved on the hinge shaft;

the first buffer sleeve is coupled to the second installation plate and provided between the first sleeve and the second sleeve; and both ends of the first buffer sleeve include cylindrical walls respectively configured to abut against the first sleeve and the second sleeve.

10. The hinge of claim 9, wherein an outer cylindrical wall of the first buffer sleeve is provided with a reinforcement block, the reinforcement block being located between the first installation plate and the second installation plate, and the reinforcement block is provided with an avoidance area for avoiding the first installation plate.

11. The hinge of claim 10, wherein a side of the reinforcing block facing the avoidance area is provided with a second limiting slot corresponding to the second upper limiting platform, and a groove wall of the second limiting slot is configured to abut against the second installation plate to limit the second installation plate.

12. The hinge of claim 11, wherein the groove wall of the second limiting slot is provided with a plurality of reinforcing ribs located at intervals along an extension direction of the first buffer sleeve, and a buffer slot is provided between any two adjacent reinforcing ribs.

13. The hinge of claim 10, wherein a clamping slot is provided on a side of the reinforcement block away from the avoidance area, and the second installation plate is clamped by the clamping slot.

14. The hinge of claim 10, wherein the hinge further comprises a second buffer sleeve sleeved on the hinge shaft and provided between the first sleeve and the first buffer sleeve, an end of the second buffer sleeve being coupled to the first sleeve, and another end of the second buffer sleeve is configured to abut against the first buffer sleeve.

15. The hinge of claim 1, wherein the second slope is an arc-shaped convex surface that protrudes upwards, and the first slope is an arc-shaped concave surface engagable with the second slope.

16. A refrigeration equipment, comprising a refrigerator body, a door and an hinge, wherein:

the door is hinged on a side of the refrigerator body through the hinge;

the hinge comprises an hinge shaft, a first hinge base and a second hinge base, wherein:

the hinge shaft is vertically arranged;

the first hinge base includes a first installation plate and a first sleeve coupled to the first installation plate, the first sleeve being sleeved on the hinge shaft and rotatably coupled to the hinge shaft to enable the first sleeve to rotate around the hinge shaft, and a lower end of the first sleeve is provided with a first slope sloping downwards; and the second hinge base is arranged below the first hinge base and includes a second installation plate and a second sleeve coupled to the second installation plate, wherein:

the second sleeve is sleeved on the hinge shaft and fixed on the hinge shaft;

an upper end of the second sleeve is provided with a second slope sloping upwards, and when the first sleeve rotates around the hinge shaft, the second slope is abutted against and cooperated with the first slope, to make the first sleeve moved from a first position to a second position and away from the second sleeve or from the second position to the first position and close to the second sleeve; and the first installation plate is detachably coupled to the door, and the second installation plate is detachably coupled to the refrigerator body, wherein:

a lower end of the first slope is provided with a first lower limiting platform;

an upper end of the second slope is provided with a second upper limiting platform; and the second upper limiting platform is configured to support the first lower limiting platform and confine the second sleeve to the second position;

the hinge further comprises a first buffer sleeve sleeved on the hinge shaft;

the first buffer sleeve is coupled to the second installation plate and provided between the first sleeve and the second sleeve;

both ends of the first buffer sleeve include cylindrical walls respectively configured to abut against the first sleeve and the second sleeve;

an outer cylindrical wall of the first buffer sleeve is provided with a reinforcement block, the reinforcement block being located between the first installation plate and the second installation plate, and the reinforcement block is provided with an avoidance area for avoiding the first installation plate; and a clamping slot is provided on a side of the reinforcement block away from the avoidance area, and the second installation plate is clamped by the clamping slot.

17. The refrigeration equipment of claim 16, wherein the first installation plate is detachably coupled to an inner side wall of the door, the second installation plate is detachably coupled to an outer side wall of the refrigerator body, and the hinge shaft is provided outside the refrigerator body and the door.

18. The refrigeration equipment of claim 16, comprising a plurality of hinges provided at intervals along an extension direction of the refrigerator body.

19. A hinge, comprising: a hinge shaft, a first hinge base, and a second hinge base, wherein:

the hinge shaft is vertically arranged;

the first hinge base includes a first installation plate and a first sleeve coupled to the first installation plate, wherein the first sleeve is sleeved on the hinge shaft and rotatably coupled to the hinge shaft to enable the first sleeve to rotate around the hinge shaft, and a lower end of the first sleeve is provided with a first slope sloping downwards; and the second hinge base is arranged below the first hinge base and includes a second installation plate and a second sleeve coupled to the second installation plate, wherein:

the second sleeve is sleeved on the hinge shaft and fixed on the hinge shaft; and an upper end of the second sleeve is provided with a second slope sloping upwards, and when the first sleeve rotates around the hinge shaft, the second slope is abutted against and cooperated with the first slope to make the first sleeve being moved from a first position to a second position and away from the second sleeve or from the second position to the first position and close to the second sleeve, wherein:

a lower end of the first slope is provided with a first lower limiting platform;

an upper end of the second slope is provided with a second upper limiting platform; and the second upper limiting platform is configured to support the first lower limiting platform and confine the second sleeve to the second position;

the hinge further comprises a first buffer sleeve sleeved on the hinge shaft;

the first buffer sleeve is coupled to the second installation plate and provided between the first sleeve and the second sleeve;

both ends of the first buffer sleeve include cylindrical walls respectively configured to abut against the first sleeve and the second sleeve;

an outer cylindrical wall of the first buffer sleeve is provided with a reinforcement block, the reinforcement block being located between the first installation plate and the second installation plate, and the reinforcement block is provided with an avoidance area for avoiding the first installation plate; and a side of the reinforcing block facing the avoidance area is provided with a second limiting slot corresponding to the second upper limiting platform, and a groove wall of the second limiting slot is configured to abut against the second installation plate to limit the second installation plate.

20. A hinge, comprising: a hinge shaft, a first hinge base, and a second hinge base, wherein:

the hinge shaft is vertically arranged;

the first hinge base includes a first installation plate and a first sleeve coupled to the first installation plate, wherein the first sleeve is sleeved on the hinge shaft and rotatably coupled to the hinge shaft to enable the first sleeve to rotate around the hinge shaft, and a lower end of the first sleeve is provided with a first slope sloping downwards; and the second hinge base is arranged below the first hinge base and includes a second installation plate and a second sleeve coupled to the second installation plate, wherein:

the second sleeve is sleeved on the hinge shaft and fixed on the hinge shaft; and an upper end of the second sleeve is provided with a second slope sloping upwards, and when the first sleeve rotates around the hinge shaft, the second slope is abutted against and cooperated with the first slope to make the first sleeve being moved from a first position to a second position and away from the second sleeve or from the second position to the first position and close to the second sleeve, wherein:

a lower end of the first slope is provided with a first lower limiting platform;

an upper end of the second slope is provided with a second upper limiting platform; and the second upper limiting platform is configured to support the first lower limiting platform and confine the second sleeve to the second position;

the hinge further comprises a first buffer sleeve sleeved on the hinge shaft and a second buffer sleeve sleeved on the hinge shaft and provided between the first sleeve and the first buffer sleeve, an end of the second buffer sleeve being coupled to the first sleeve, and another end of the second buffer sleeve is configured to abut against the first buffer sleeve.

* * * * *